United States Patent
Westmacott et al.

(10) Patent No.: US 11,087,577 B2
(45) Date of Patent: Aug. 10, 2021

(54) SYSTEMS AND METHODS OF SECURE PIN CODE ENTRY

(71) Applicant: Sensormatic Electronics, LLC, Boca Raton, FL (US)

(72) Inventors: Ian C. Westmacott, Tewksbury, MA (US); Shahar Ze'Evi, Holliston, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 158 days.

(21) Appl. No.: 16/221,184

(22) Filed: Dec. 14, 2018

(65) Prior Publication Data

US 2020/0193746 A1 Jun. 18, 2020

(51) Int. Cl.
| | |
|---|---|
| *G06F 3/01* | (2006.01) |
| *G07C 9/37* | (2020.01) |
| *G06K 9/00* | (2006.01) |
| *G07C 9/33* | (2020.01) |
| *G07C 9/38* | (2020.01) |

(52) U.S. Cl.
CPC .............. *G07C 9/37* (2020.01); *G06F 3/013* (2013.01); *G06K 9/00604* (2013.01); *G07C 9/33* (2020.01); *G07C 9/38* (2020.01)

(58) Field of Classification Search
CPC .... G07C 9/37; G07C 9/38; G07C 9/33; G06F 3/013; G06K 9/00604
See application file for complete search history.

(56) References Cited

U.S. PATENT DOCUMENTS

| | | | |
|---|---|---|---|
| 2007/0055517 A1* | 3/2007 | Spector | G06F 21/32 704/246 |
| 2012/0086645 A1* | 4/2012 | Zheng | G06F 3/04842 345/168 |
| 2013/0342313 A1* | 12/2013 | Conlin | G07C 9/28 340/5.51 |
| 2017/0205983 A1* | 7/2017 | Oguz | G06F 21/6218 |
| 2017/0243410 A1* | 8/2017 | Caballero | G06Q 10/08 |
| 2017/0308690 A1* | 10/2017 | Tsukamoto | G06T 7/00 |
| 2017/0330507 A1* | 11/2017 | Evans, V | G09G 3/3208 |
| 2018/0108192 A1* | 4/2018 | Ho | H04L 67/125 |
| 2019/0034606 A1* | 1/2019 | Mapen | G06K 9/00604 |
| 2019/0094981 A1* | 3/2019 | Bradski | G06F 3/011 |
| 2019/0278955 A1* | 9/2019 | Mani | G07C 9/33 |

\* cited by examiner

*Primary Examiner* — Eleni A Shiferaw
*Assistant Examiner* — Stephanie S Ham
(74) *Attorney, Agent, or Firm* — Foley & Lardner LLP

(57) ABSTRACT

An access control apparatus includes a sensor and an authentication circuit coupled to the sensor. The sensor detects eye movement of a user. The authentication circuit stores predetermined access code data corresponding to the user. The authentication circuit compares the detected eye movement of the user to the predetermined access code data. Based on the comparison indicating that the detected eye movement matches the predetermined access code data, the authentication circuit permits access beyond an access control point.

17 Claims, 8 Drawing Sheets

SYSTEMS AND METHODS OF SECURE PIN CODE ENTRY

BACKGROUND

Access control restricts entrance to both physical and electronic locations to authorized persons. Access control can be achieved by restricting entrance through a variety of physical access control points (e.g., doors, turnstiles, parking gates, elevators) or electronic access control points (e.g., automated teller machines (ATM) or cell phone lock screens) where granting access can be electronically controlled. Access restrictions may be temporarily or permanently removed upon the production of a physical or electronic key, such as a numerical code.

SUMMARY

One implementation of the present disclosure is an access control apparatus. The access control apparatus includes a sensor and an authentication circuit coupled to the sensor. The sensor detects eye movement of a user. The authentication circuit stores predetermined access code data corresponding to the user, and compares the detected eye movement to the predetermined access code data. If the comparison indicates that the detected eye movement matches the predetermined access code data, the authentication circuit permits access beyond an access control point. The access control point can be virtual and the authentication circuit permits electronic access to an electronic account based on the comparison indicating that the detected eye movement matches the predetermined access code data. Access beyond the access control point may include displaying account information associated with the electronic account on a user interface in communication with the authentication circuit.

Another implementation of the present disclosure is a method. The method includes using a sensor to detect an eye movement of a user to generate a detected access code. An authentication circuit coupled to the sensor then compares the detected access code to a predetermined access code stored by the authentication circuit. The authentication circuit then outputs an access permission decision (e.g., "permission granted" or "permission denied") based on the comparison of the detected access code and the predetermined access code to an access controller.

Another implementation of the present disclosure is an access control apparatus. The access control apparatus includes a display, a sensor in communication with the display, an image analyzer in communication with the sensor, and an authentication circuit coupled to the sensor. The display presents a user interface having an array of inputs. The sensor detects eye movement of a user (e.g., a user attempting to gain access to the access). The image analyzer determines a detected access code by evaluating detected eye movement relative to known locations of each input in the array of inputs. The authentication circuit stores predetermined access data corresponding to the user. The authentication circuit compares the detected access code to the predetermined access code data and permits electronic access beyond an access control point if the comparison indicates that the detected access code matches the predetermined access code data.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
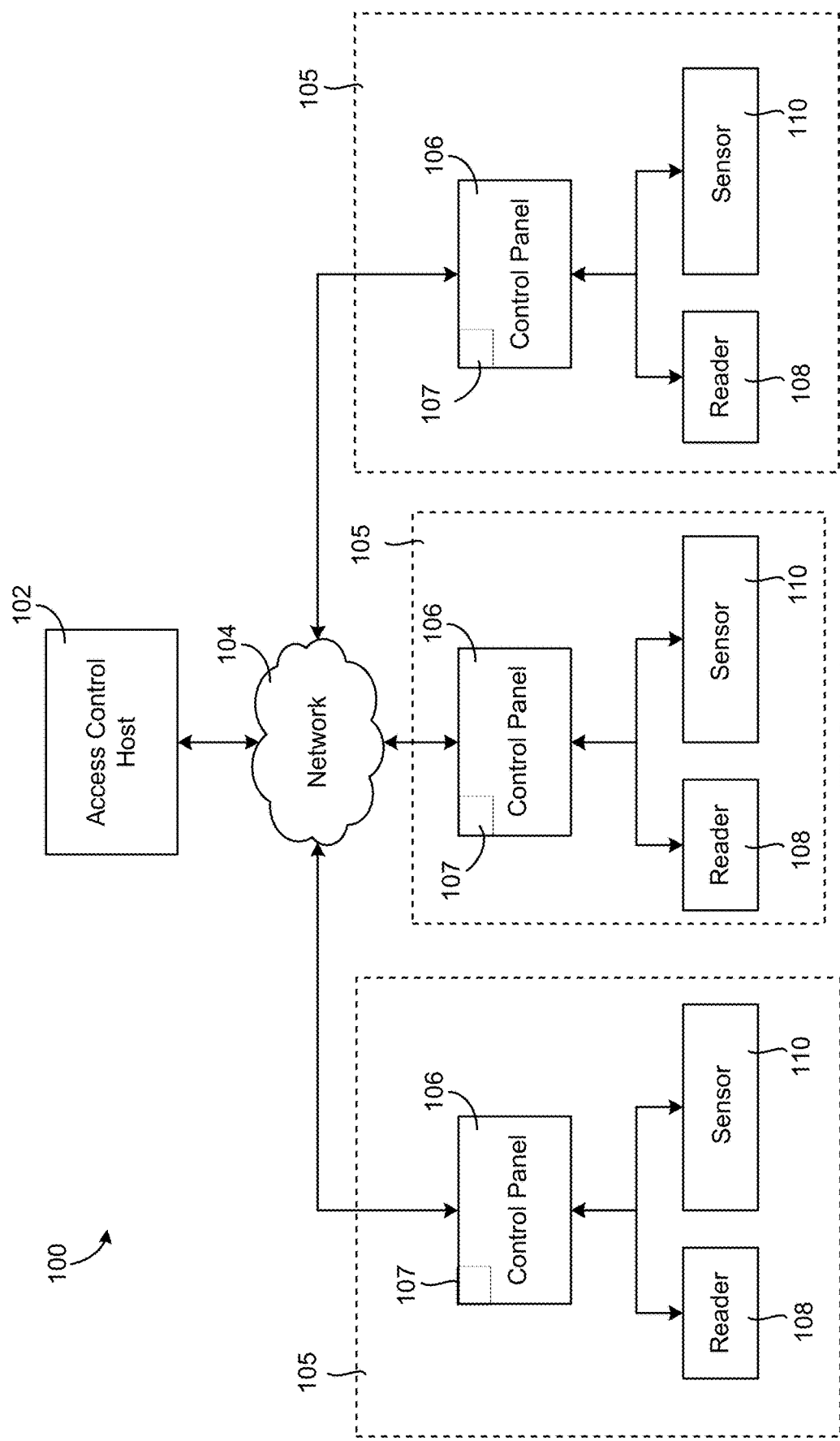
FIG. 1 is a block diagram of an access control system that can incorporate one or more access control apparatuses, according to an embodiment of the present disclosure.

The present disclosure relates generally to the field of access control systems, and more particularly to systems and methods for entering sensitive information, such as a PIN number or security code, using discrete body movement. The present disclosure can use a system of one or more sensors that track the eye movement of a user attempting to gain access to or authorization to use an otherwise restricted entity, such as a bank account, point-of-sale (POS) machine, cell phone, or gasoline pump, for example. The sensor tracks eye movements, which are then assigned an input based upon a detected direction or orientation of the eye relative to an array of one or more possible inputs. The assigned input values together create a detected access code, which is communicated to an authentication circuit. The authentication circuit is in electrical communication with a memory storing authentication data, including a predetermined access code. The authentication circuit evaluates the detected access code against the predetermined access code and determines whether or not access should be permitted. The authentication circuit then either provides or denies access based upon the evaluation.

An access control apparatus can receive data from the sensor or the authentication circuit (e.g., credential data) and validate access to a user based on the received data. In some embodiments, the access control apparatus includes one or more access control points. The access control points can include lock screens, user interfaces, electronic locks, actuators, or other controllable devices that can be operated to automatically grant or deny access through the access control points. For example, an ATM access control point can include a user interface that prompts a user for entry of a PIN number, and will allow virtual access to an account (e.g., to make a withdrawal) associated with the PIN number upon determining that the detected PIN number matches the predetermined PIN associated with the account.

Each access control apparatus can include a control panel, a reader, one or more sensors, and one or more access control points. The control panel can be connected to the sensors and the reader via a hardwired serial connection. The control panel can include a monitor or screen (e.g., a liquid crystal display or a light emitting diode display) that displays a user interface. In some embodiments, the control panel first receives credential data associated with an account from the reader and sends the credential data to a central access control host (e.g., an access control server). The central access control host can access predetermined credential data associated with the account, including predetermined access code data. The user can then be prompted to enter a security code (e.g., a PIN number) associated with the account by the user interface. The sensor detects the eye movements of the user during the entry process and assigns inputs corresponding to the eye movements to produce a detected access code, which is sent to the access control host. The access control host can determine whether to grant or deny access by comparing the detected access code to the predetermined access code data. The access control host can send a result of the determination (e.g., grant or deny access) to the control panel, which operates the access control apparatus accordingly. For example, the control panel can unlock a cellular phone in response to receiving a control signal from the access control host. The central access control host can access and send the predetermined credential data associated with the account to the authentication circuit, which can locally compare the detected access code with the predetermined access code data and generate a command to the control panel to permit or deny access beyond the access control point based upon the determination.

Eye-movement-based data entry access control systems improve upon the security offered by traditional physical keypad control devices. Using embodiments of the present disclosure, the present solution can prevent unwanted onlookers from detecting or inferring an access code by physically monitoring the hand movement or button movement as an access code is inputted. Obscurants, including barriers, body parts, or otherwise are not needed to prevent unwanted viewing of code entry.

Referring to FIG. 1, among others, an access control system 100 is depicted. The access control system 100 monitors and controls access to various virtual or physical locations (e.g., virtual bank accounts, gasoline pumps, automated teller machines, credit card readers, garage door controllers, security systems, physical safes or lockboxes) using a collection of access control apparatuses 105. Each access control apparatus 105 is shown to include a physical control panel 106, an access control point 107, a reader 108, and a sensor 110. Physical control panels 106 can be connected to readers 108 and sensors 110 via a hardwired serial connection (e.g., RS-485 serial communication lines). The access control apparatuses 105 selectively restrict user access beyond access control points 107 associated with each access control apparatus 105, as explained below.

Readers 108 can receive credential data from a user via an access control card of a user. For example, readers 108 can read a smartcard (e.g., in integrated circuit card) possessed by a user to automatically obtain a smartcard ID from the smart card. The readers 108 may also be adapted to scan and read other types of identification card, including credit cards and debit cards. In some embodiments, the readers 108 scan for identification signals instead of reading physical identification cards. For example, a phone or other transmitting unit could transmit a radio frequency identification (RFID) signal, a near-field communication (NFC) signal, or a Bluetooth signal to the readers 108. The readers 108 can detect the transmitted signal and determine credential data from the user based upon the received signal. In some examples, the readers 108 communicate the credential data to the control panel, which may communicate with a network 104 or access control host 102 to access additional credential data associated with the user.

Sensors 110 can also receive credential data from a user by detecting eye movement and/or eye composition (e.g., iris patterns) of the user. For example, the sensors 110 can be optical sensors that track eye movement by sensing light (e.g., infrared light) reflected from the eye of a user. In some embodiments, the sensors 110 can track the corneal light reflection and the center of the pupil over time, reflections from front of the cornea and the back of the eye lens, or features from inside the eye, such as retinal blood vessels, to track the gaze of the user. The sensors 110 can be video cameras or digital still cameras, for example, which continuously or periodically monitor the point of gaze or the motion of the eye relative to the head. The sensors 110 can communicate detected eye movement to the control panel 106, which can include image analyzing tools that review data taken from the sensors 110 and assign inputs to the detected eye movements. The control panel 106 can locally determine whether the inputs produced by user eye movement are sufficient to permit access beyond an access control point, or can send the inputs produced by the user eye movement through the network 104 to the access control host 102, which makes an access determination that is returned to the control panel 106 of the access control apparatus 105.

Access control apparatuses 105 can be positioned in various different places throughout a building, city, country, or the globe. For example, an access control apparatus 105 can be present in each ATM owned and/or operated by a specific bank, which could include machines in multiple states and/or countries. The access control apparatus 105 can then be used to authorize transactions (e.g., withdrawals, advances, balance inquiries, etc.) occurring at each ATM. The access control apparatuses 105 can also be included in gasoline pumps, for example, to authorize the purchase of gas by a user. POS systems within bars, restaurants, or stores can each include an access control apparatus 105. The access control apparatuses 105 generally include virtual locks, electronic actuators, or other controllable devices that can be operated to automatically grant or deny access through the access control points 107. For example, a virtual access control point 107 can be presented on a display in communication with the control panel 106 and can include a virtual lock screen configured to lock and unlock access to a virtual bank account in response to a control signal from the physical control panel 106. Each access control device 105 can be configured to control a particular access control point 107 (e.g., a specific ATM, etc.).

User interactions with readers 108 (e.g., access requests) and sensors 110 can be recorded as events and sent to access control host 102 via a communications network 104 (e.g., a TCP/IP network, a building automation and control network, a LAN, a WAN, etc.). Each event may include, for example, a timestamp, a device ID identifying the access control apparatus 105, a security credential provided by the user at the access point (e.g., a smartcard ID, an access code, etc.), a user ID, and/or any other information describing the access request. Access control host 102 can process the events and determine whether to allow or deny the access request. In some embodiments, access control host 102 accesses a security database to determine whether the security credential provided by the user matches a stored security credential. In some embodiments, access control host 102 determines whether the user associated with the access request (e.g., defined by the user ID or smartcard ID) is authorized to access the area controlled by the access control apparatus 105. In some embodiments, access control host 102 displays an alarm or prompt for a security workstation (e.g., a computer operated by security personnel) to allow or deny the access request.

Figure 2:
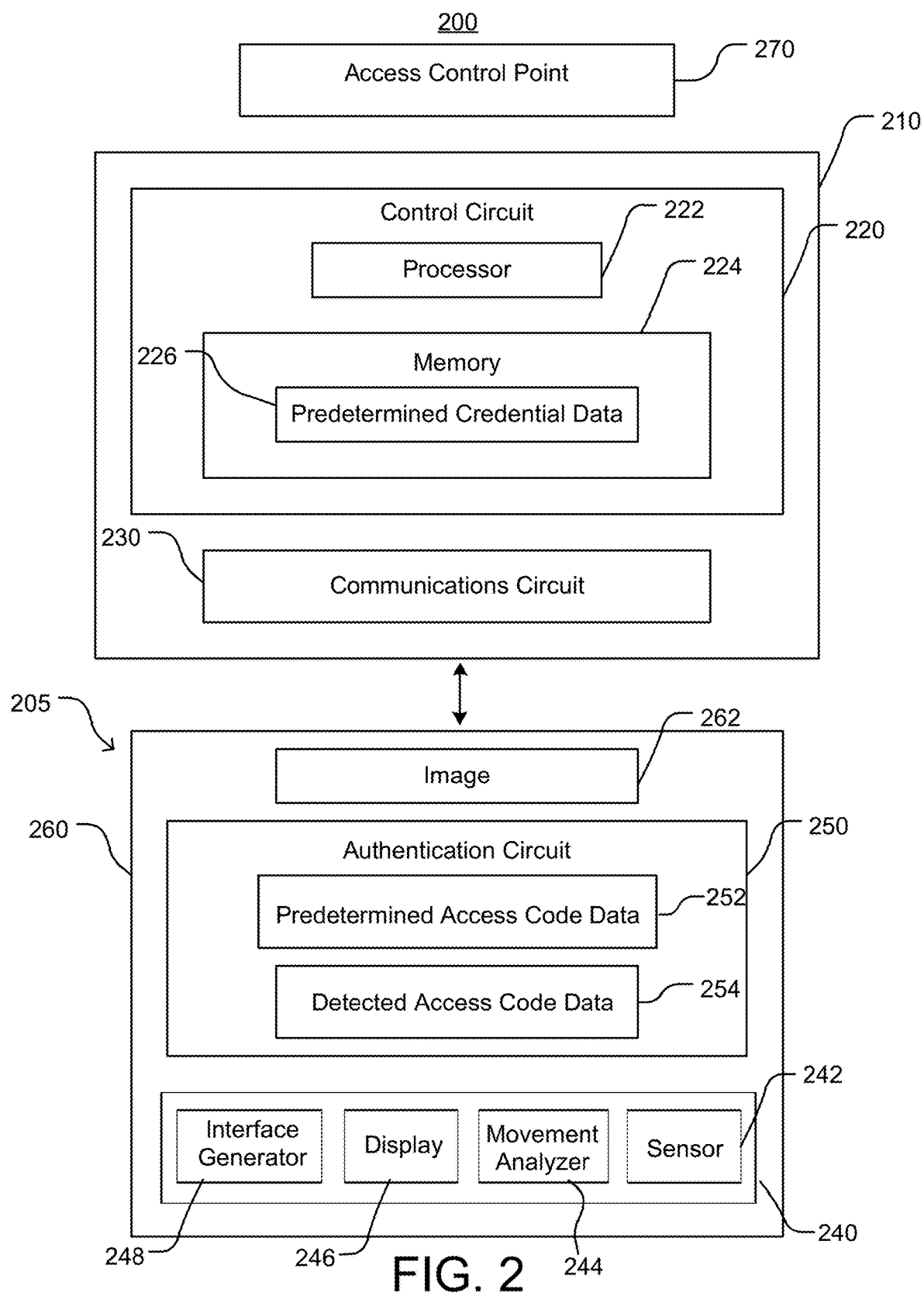
FIG. 2 is a block diagram of an access control apparatus operating with an identification card reader, according to an embodiment of the present disclosure.

Referring now to FIG. 2, among others, an access control apparatus 200 operating with an access controller 210 and an access authenticator 205. The access control apparatus 200 can incorporate features of the access control system 100 described with reference to FIG. 1.

The access control apparatus 200 includes an access controller 210, which can incorporate features of the access control host 102, physical control panel 106, reader 108, and sensor 110 described with reference to FIG. 1. The access controller 210 includes a control circuit 220 and a communications circuit 230. The control circuit 220 is shown to include a processor 222 and memory 224. Processor 222 can be a general purpose or specific purpose processor, an application specific integrated circuit (ASIC), one or more field programmable gate arrays (FPGAs), a group of processing components, or other suitable processing components. Processor 222 is configured to execute computer code or instructions stored in memory 224 or received from other computer readable media (e.g., CDROM, network storage, a remote server, etc.).

Memory 224 can include one or more devices (e.g., memory units, memory devices, storage devices, etc.) for storing data and/or computer code for completing and/or facilitating the various processes described in the present disclosure. Memory 224 can include random access memory (RAM), read-only memory (ROM), hard drive storage, temporary storage, non-volatile memory, flash memory, optical memory, or any other suitable memory for storing software objects and/or computer instructions. Memory 224 can include database components including credential data 226, object code components, script components, or any other type of information structure for supporting the various activities and information structures described in the present disclosure. Memory 224 can be communicably connected to processor 222 via processing circuit 220 and may include computer code for executing (e.g., by processor 222) one or more processes described herein. When processor 222 executes instructions stored in memory 224, processor 222 generally configures the access controller 210 (and more particularly processing circuit 220) to complete such activities.

The communications circuit 230 can include wired or wireless interfaces (e.g., jacks, antennas, transmitters, receivers, transceivers, wire terminals, etc.) for conducting data communications with various systems, devices, or networks. For example, the communications circuit 230 can include an Ethernet card and port for sending and receiving data via an Ethernet-based communications network. As another example, the communications circuit 230 can include a WiFi transceiver for communicating via a wireless communications network. The communications circuit 230 can communicate via local area networks (e.g., a building LAN), wide area networks (e.g., the Internet, a cellular network, etc.), and/or conduct direct communications (e.g., NFC, Bluetooth, etc.). In various embodiments, the communications circuit 230 can conduct wired and/or wireless communications. For example, the communications circuit 230 can include one or more wireless transceivers (e.g., a Wi-Fi transceiver, a Bluetooth transceiver, a NFC transceiver, a cellular transceiver, etc.) for communicating with access control host 102 via communications network 104. The communications circuit 230 can access or retrieve predetermined credential data 226 from the communications network 104 or access control host 102, and can also communicate the predetermined credential data 226 to the access authenticator 205.

The control circuit 220 can generate a request signal to request credential data from the access authenticator 205. The control circuit 220 can generate the request signal to cause the access authenticator 205 to transmit credential data, and can cause the communications circuit 230 to transmit the request signal for reception by the access authenticator 205. The communications circuit 230 can transmit the request signal as an electromagnetic signal. The communications circuit 230 can transmit the request signal to include a sufficient power level (e.g., within a threshold distance of the access controller 210 at which the access authenticator 205 would be expected to be located when being used to request access) to cause authentication circuit 250 of access authenticator 205 to be able to transmit an output signal. The control circuit 220 can control operation of one or more access control points 270, and can selectively permit access through the access control points 270 based upon the signal received from the access authenticator 210.

The access authenticator 205 includes an input module 240 that receives and analyzes credential input received from a user. The input module 240 can include a display 246 that presents a user interface (e.g., one of the user interfaces 600, 700, shown in FIGS. 6 and 7) generated by an interface generator 248 to include multiple possible inputs. An eye tracking sensor 242 can be used to track eye movement of a user as the eye of the user passes over and looks at various inputs on the user interface. Data taken by the sensor 242 can be reported to a movement analyzer 244. The data taken by the sensor 242 may be in the form of video or still digital images, for example. The movement analyzer 244 is in communication with the interface generator 248 and the display 246, which can then evaluate the data from the sensor to assign inputs to each eye movement based upon the eye location and the known location of each input on the user interface.

The movement analyzer 244 generates a detected input sequence by extracting one or more features of the data taken by the sensor 242 and comparing the one or more features to one or more templates stored within the movement analyzer 244. The one or more templates can relate to eye positions corresponding to the selection of each input on the user interface, for example. The movement analyzer 244 then generates a match score for each attempted input based on the comparison (e.g., a percentage match confidence between zero percent (no match) and one hundred percent (certain match)). The match score can also be influenced by eliminating possible inputs with very low match scores, such as match scores less than a minimum match score (e.g., less than a 5% match). The movement analyzer 244 then compares the match score to a threshold match score (e.g., 80% match confidence) and outputs a detected input value using the known location of each input on the user interface. The movement analyzer 244 can continue this process until all data from the sensor 242 has been evaluated. The multiple detected input values, when combined, generate a sequence that corresponds to detected access code data 254. The detected access code data 254 can be communicated from the input module 240 to the authentication circuit 250, where it can be at least temporarily stored in memory.

The authentication circuit 250 of the access authenticator 205 includes memory that stores predetermined access code data 252 corresponding to the user. The predetermined access code data 252 can be stored locally or can be received from external sources including the access controller 210 (e.g., through the communications circuit 230), a communications network 104, or an access control host 102, for example. The predetermined access code data 252 can include one or more types of suitable access codes, such as a PIN number, a password, an entry code, or a pattern of an iris of the user. As indicated previously, the authentication circuit 250 also stores the detected access code data 254 communicated from the input module 240.

The authentication circuit 250 can compare the detected access code data 254 generated by the input module 240 to the predetermined access code data 252. For example, the authentication circuit 250 can evaluate each individual input of the detected access code data 254, and compare it to the predetermined access code data 252. The authentication circuit 250 can calculate a match score based on the comparison (e.g., a percentage match confidence between zero percent (no match) and one hundred percent (certain match)). The authentication circuit 250 can compare the match score to a threshold match score, and output an indication that the detected access code data 254 matches the predetermined access code data 252 based on the match score meeting (or exceeding) the threshold match score. If the predetermined access code data includes a numerical passkey (e.g., each character of the passkey is of the group of integers '0' through '9'), a higher threshold match score may be used, for example, than predetermined access code data including an alphanumeric passkey (e.g., each character of the passkey is of the group '0' through '9' or 'A' through 'Z').

The authentication circuit 250 can output an access permission decision based on the comparison indicating that the detected access code data matches the predetermined access code data 252. The authentication circuit 250 can output the permission decision for receipt by the access controller 210. In some embodiments, the authentication circuit 250 outputs the access permission decision based on the detected access code 254 not matching the predetermined access code data 252. For example, the authentication circuit 250 can execute an output function which, in response to receiving the request signal from the control circuit 220, determines whether the detected access code data 254 matches the predetermined access code data 252. Responsive to determining the detected access code data 254 to matches the predetermined access code data 252, the authentication circuit 250 outputs the access permission decision. If the detected access data does not match the predetermined access code data 252, the authentication circuit 250 outputs an error signal, terminates the output function, or otherwise does not output access permission. In some embodiments, the authentication circuit 250 does not transmit the authentication signal unless the reader 108 (shown in FIG. 1) is in a state of detecting the credential data of the user (e.g., an identification card of the user is actively being read by the reader 108, and the reader 108 outputs a signal indicating that the reader 108 is currently detecting the credential data regarding the user).

In some embodiments, the access authenticator 205 includes a housing 260 that supports the input module 240 and the authentication circuit 250. The input module 240 can be disposed in the housing 260 so that a surface of the sensor 242 is exposed proximate the display 246. By having the sensor 242 exposed and near the display 246, which presents the user interface and possible inputs, the sensor 242 can be generally aligned with the eye of a user as it moves to inputs presented on the user interface. In some embodiments, the sensor 242 is centered within the display, which can further facilitate the image analyzing process performed by the movement analyzer 244 by reducing the amount of extrapolation that the movement analyzer 244 uses to calculate a detected input value. In some examples, the sensor 242 can detect an iris pattern of the user while the user is aligned with the display 246. The predetermined access code data 252 can also include a predetermined image 262 of the iris pattern of the user, which can be authenticated by the authentication circuit 250 using the detected iris pattern retrieved by the sensor 242.

The permission decision communicated by the access authenticator 205 can be used by the access controller 210 to validate access into a virtual account, a safe, a lockbox, a room, or other secured locations. The control circuit 220 can store predetermined credential data 226 corresponding to the user, including account information. Upon receiving a positive permission decision from the access authenticator 205, the control circuit 220 can output an access command to enable access to the account associated with the predetermined credential data 226. For example, the control circuit 220 can output the access command to an access control point 270 (e.g., a virtual account lock screen, a phone lock screen, a lock, a gas pump, a POS) to cause the access control point 270 to open or otherwise allow access to the user. In some examples, the access control point 270 is presented on the display 246, and once an access command is received by the access control point 270, virtual access to an associated account is presented on the display 246.

Figure 3A:
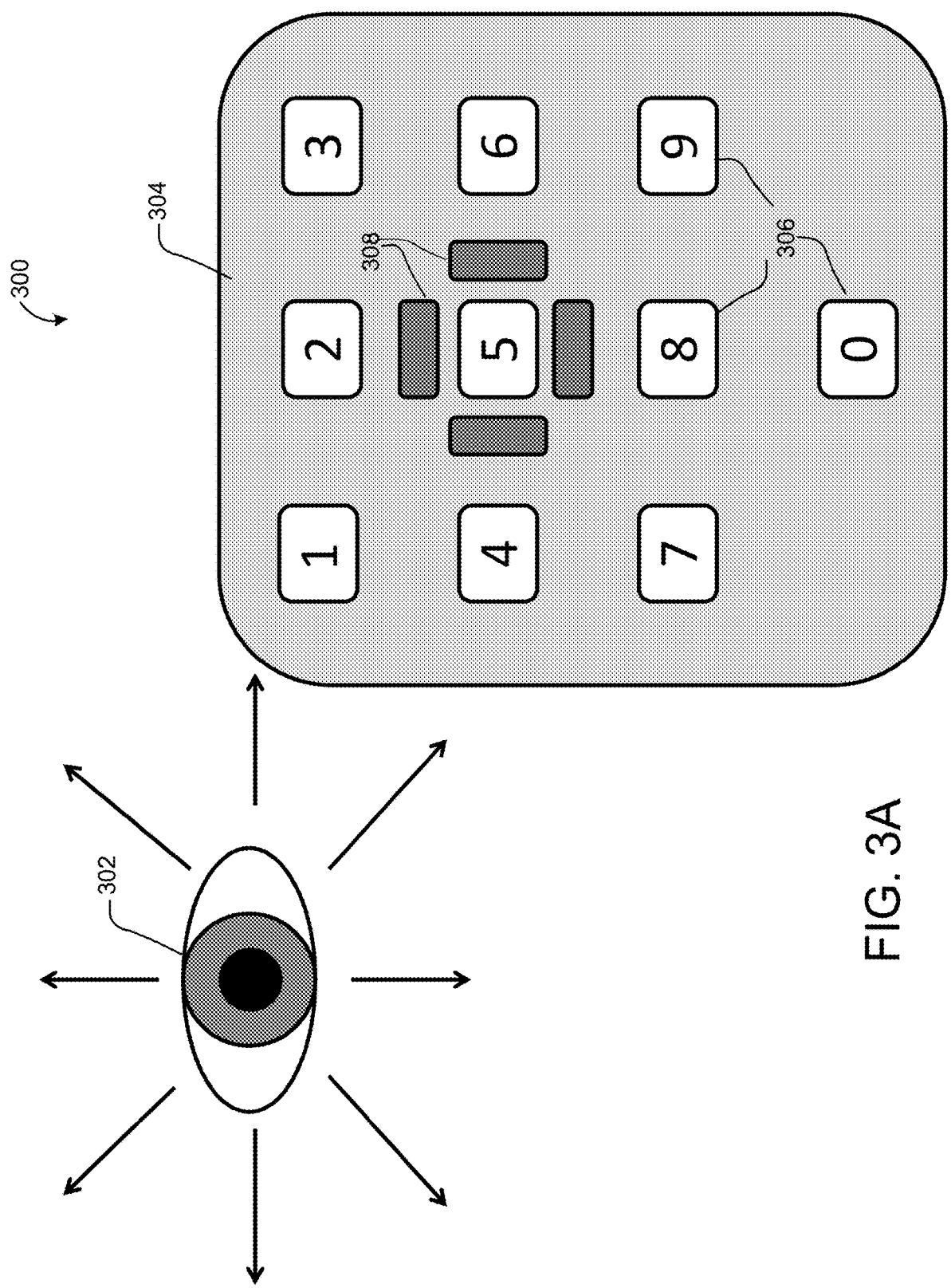
FIG. 3A is a schematic diagram of a user eye and possible movements, along with a user interface displaying an array of inputs.
Figure 3B:
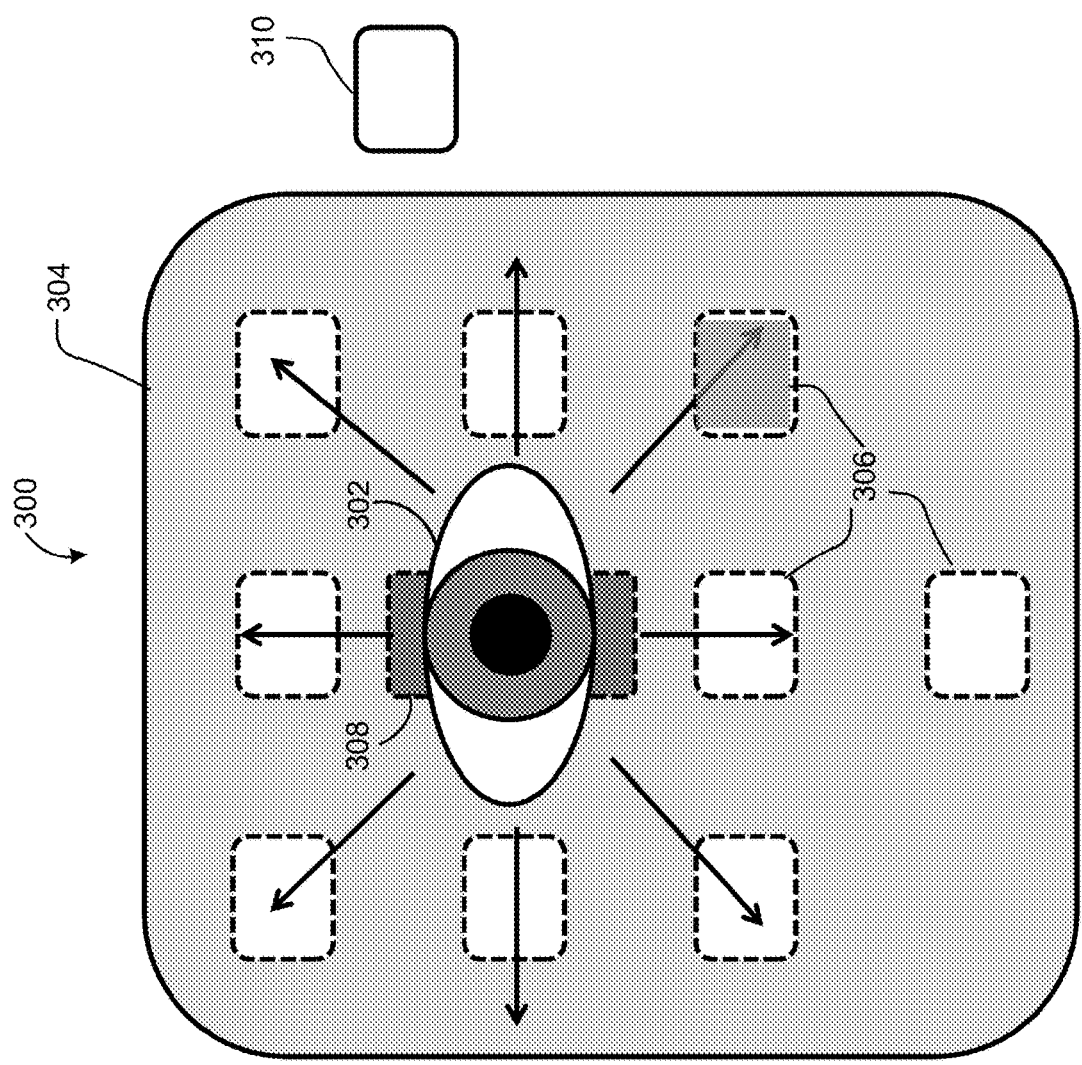
FIG. 3B is a schematic diagram of the user eye positioned in line with the array of inputs from FIG. 3A, depicting user eye movements which correspond with selection of individual inputs in the array of inputs.

Referring now to FIGS. 3A and 3B, a user interface 300 is depicted along with an eye 302 of a user. The user interface 300 is presented upon a display 304, and can be incorporated into the access control apparatus 200. The user interface 300 can be generated by an interface generator (e.g., the interface generator 248, shown in FIG. 2) to include an array of inputs 306. The array of inputs 306 can be arranged about the user interface 300 in a number of ways, including a traditional 10-digit keypad, as shown. One or more sensors 308 can be positioned proximate to or within the interior of the display 304, for example, to track the movement of the eye 302 of the user.

As depicted, the eye 302 can travel in several directions, each of which can correspond to a different input 306 in the array of inputs 306. For example, each direction of eye movement can correspond to a different desired input made by the user, each of which is detectable by the sensors 308 and discernible by a movement analyzer (e.g., movement analyzer 244). If a user looks downward and to the right, the sensor 308 can capture one or more images of the eye in an orientation looking downward and to the right. By communicating with the interface generator, the movement analyzer can determine that the orientation of the eye 302 corresponds to an attempted input of "9" on the keypad in the user interface 300. The input of "9" can be saved in the memory of the movement analyzer as a detected input value. The sensor 308 can continue to capture images of the eye 302 of the user as the eye 302 travels to the next desired input 306, until all inputs 306 have been selected, imaged by the sensor 308, and analyzed by the movement analyzer to produce the detected access code data 254.

In some embodiments, an additional input 310 can be provided with the display 304 and the user interface 300 to prompt the sensor 308 to capture an image. For example, a button 310 in communication with the sensor 308 can be physically or virtually actuated (e.g., if the display 304 is a touch screen) by the user when the user is looking directly at a desired input 306 on the user interface 300. The sensor 308 will then capture an image of the eye 302 in an orientation that should correspond to the desired input 306, which could eliminate potential noise that could arise from the eye 302 traveling over multiple inputs prior to arriving at the actual desired input. The capture button 310 also allows an input (in this case, the "5" on the keypad) to be positioned near the center of the user interface 300, in the eye's 302 natural resting position. In an example, the user could be given a countdown until an image will be taken by the sensor 308, so that the eye 302 can be properly focused on the desired input 306 prior to the sensor 308 detecting the position of the eye 302.

Figure 4:
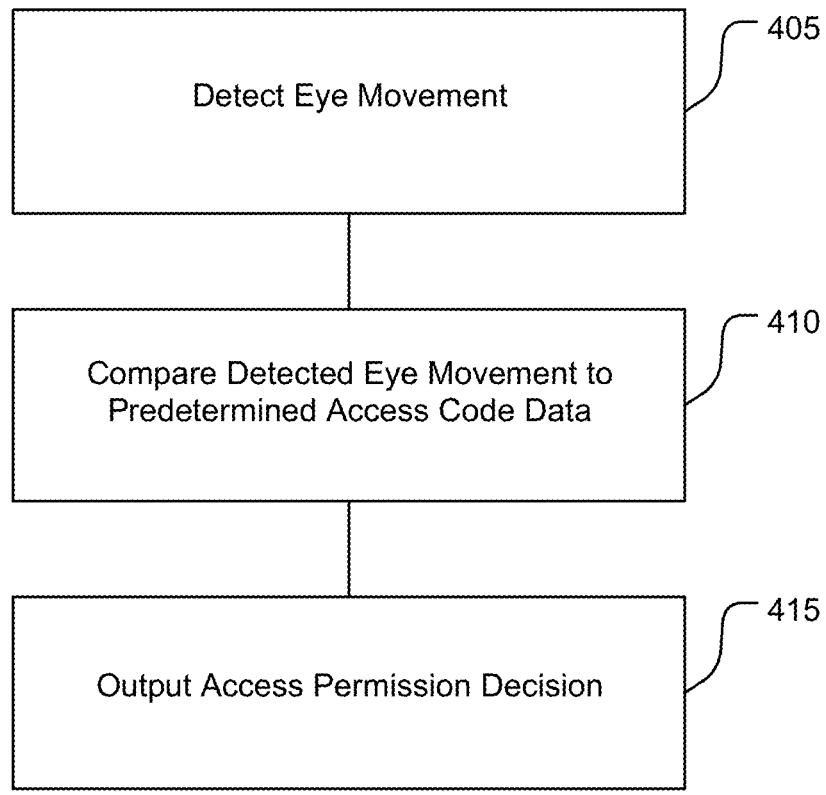
FIG. 4 is a flow diagram of a method of operating an access control apparatus, such as the access control apparatus of FIG. 2, according to an embodiment of the present disclosure.

FIG. 4 depicts a method 400 of operating an access control apparatus. The method 400 can be performed using the access control system 100, the access control apparatus 200, and/or the user interface 300.

At 405, a sensor detects eye movement of a user. The sensor can optically detect eye movement of a user by capturing images of the eye periodically as it pans over and gazes at different inputs presented on a user interface, for example. The eye movement of the user can be analyzed in conjunction with the user interface to produce a detected access code. The detected access code corresponds to a sequence of inputs that the eye of the user focused on during input entry. The user interface can be presented on a display, such as a gasoline pump, an ATM, or a POS. The sensor can be embedded in the display or positioned about the outer perimeter of the display.

At 410, an authentication circuit compares the detected access code to a predetermined access code stored by the authentication circuit. Because the authentication circuit is coupled to the sensor, the authentication circuit can receive raw and/or analyzed data from the sensor, including the detected access code. The detected access code is compared to the predetermined access code, which may be a PIN number or an alphanumeric passkey, for example, corresponding to a secure account.

At 415, the authentication circuit outputs an access permission decision for receipt by an access controller. The access permission decision is based on the comparison of the detected access code and the predetermined access code. If the detected access code and the predetermined access code are determined to match, access is granted. If the detected access code and the predetermined access code do not match, an error statement may be generated on the user interface or the user may be prompted to enter a new access code.

Figure 5:
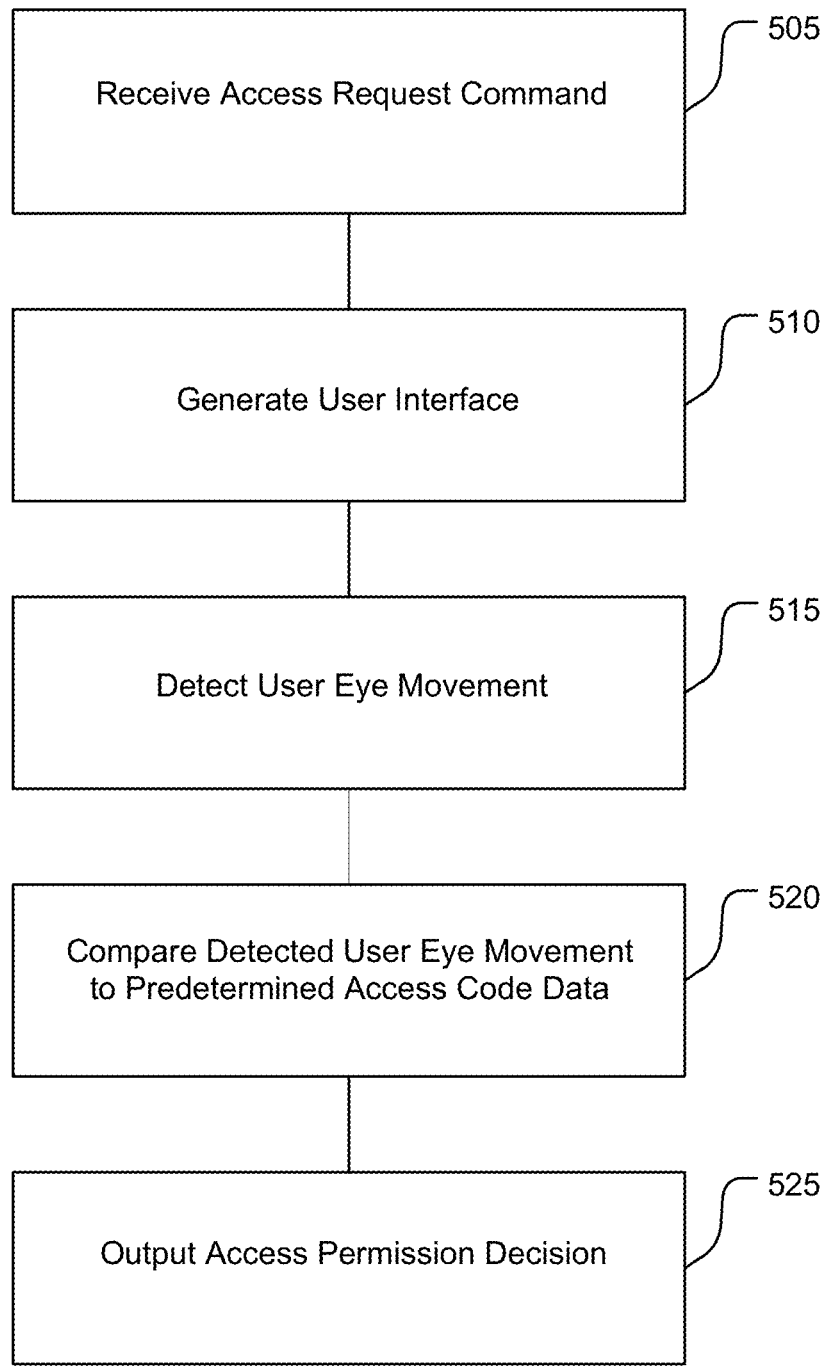
FIG. 5 is a flow diagram of a method of operating an access control apparatus, such as the access control apparatus of FIG. 2, according to an embodiment of the present disclosure.

FIG. 5 depicts a method 500 of operating an access control apparatus. The method 500 can be performed using the access control system 100, the access control apparatus 200, and/or the user interface 300.

At 505, an access control apparatus receives an access request command. For example, a user may insert a credit or debit card into an identification reader included in the access control apparatus. The identification reader will read the identification presented and communicate the identified credentials associated with the account to a processor or controller having access to a local or external memory. The credentials are used by the processor or controller to retrieve predetermined credential data, including account data and predetermined access code data (e.g., a PIN number associated with the account). The predetermined access code data can be communicated to an authentication circuit within the access control apparatus, where they can be temporarily stored.

Figure 7:
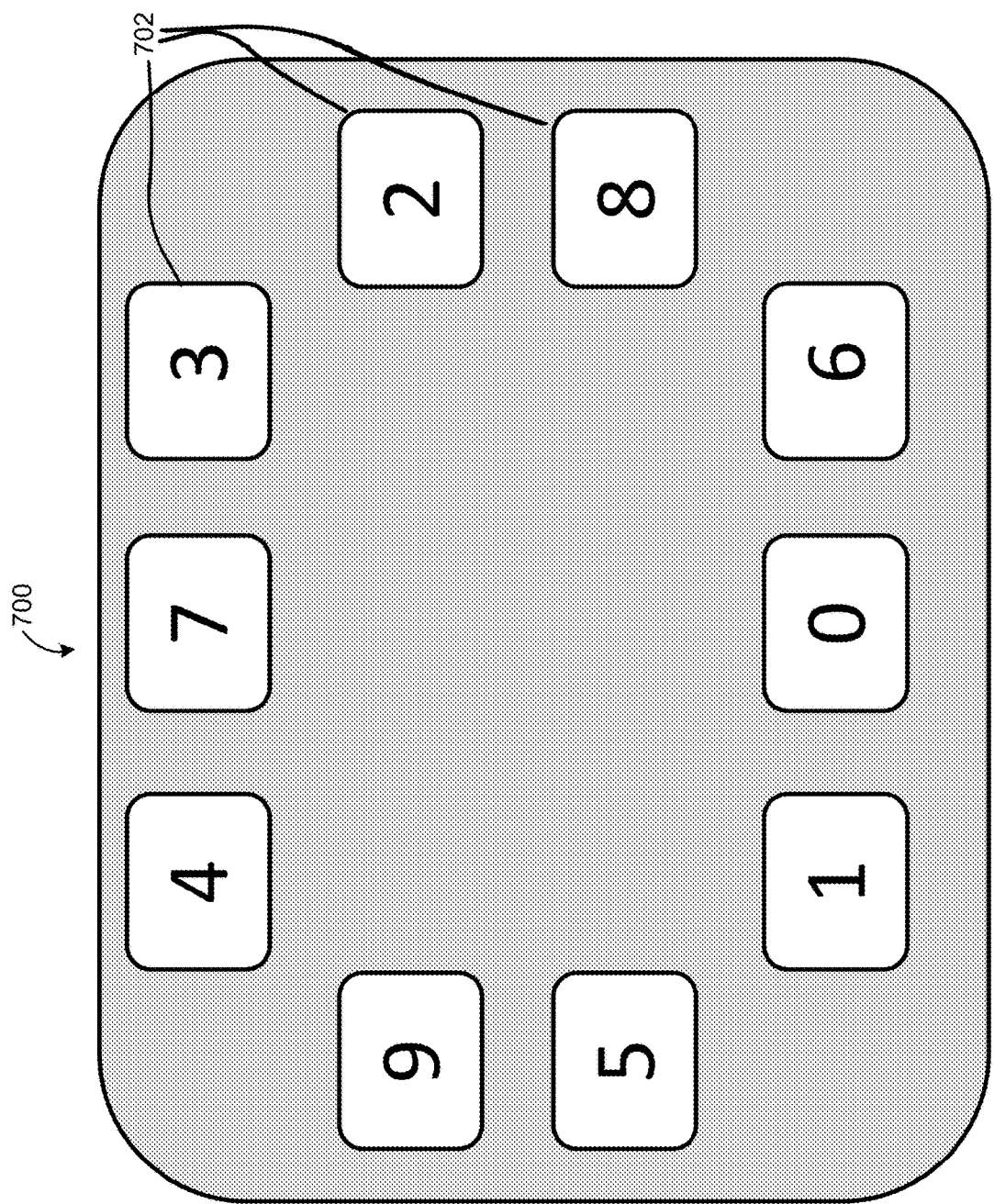
FIG. 7 is an example of a user interface that can be incorporated into an access control apparatus according to an embodiment of the present disclosure, such as the access control apparatus of FIG. 2.

At 510, a user interface is generated by an interface generator in the access control apparatus. The user interface is presented on a display, and can include a plurality of inputs, including numbers, letters, symbols, and the like. In some examples, the user interface presents a traditional 10-digit keypad, as shown in FIG. 3A. As an additional security measure, the user interface can be generated to include a traditional 10-digit keypad, but with the inputs (i.e., numbers) presented in non-sequential order, as shown in FIG. 7. The location of the inputs on the user interface can be randomized for each individual user. The user interface can also include a prompt requesting the entry of a security code, such as a PIN number.

At 515, the user inputs a security code using eye movement, which is detected by one or more sensors. The user passes an eye over each desired input, and the sensor captures an image or video of the eye in an orientation gazing at the desired input. The sensor communicates data to an image analyzer, which evaluates the orientation of the eye in each image compared to known locations of inputs on the user interface. The image analyzer matches each detected eye orientation to an input on the user interface to generate a sequence of detected inputs. When arranged in sequential order, the inputs generate a detected access code.

At 520, the authentication circuit receives the detected access code from the image analyzer and compares the detected access code to the predetermined access code that it previously stored. For example, the authentication circuit can compare the PIN associated with the account to the PIN detected by the sensor.

At 525, the authentication circuit outputs an access permission decision based upon the comparison of detected access code and predetermined access code data. If the detected access code matches the predetermined access code data, the authentication circuit issues permission to pass beyond the access point (e.g., a lock screen or home screen on an ATM). In some embodiments, the access point is virtual, and account data and account options are presented on the display. Once access has been granted, the user may be allowed to manipulate or obtain information about the account, including charging items to an account or withdrawing money from an account. After access to the account has been granted, additional transactions made by the user may be communicated from the access control apparatus to a network or an access control host. However, if the detected access code does not match the predetermined access code data, an error message may be displayed by the user interface. Alternatively, the user may be prompted to re-enter an access code, and the process 500 returns to 510.

Figure 6:
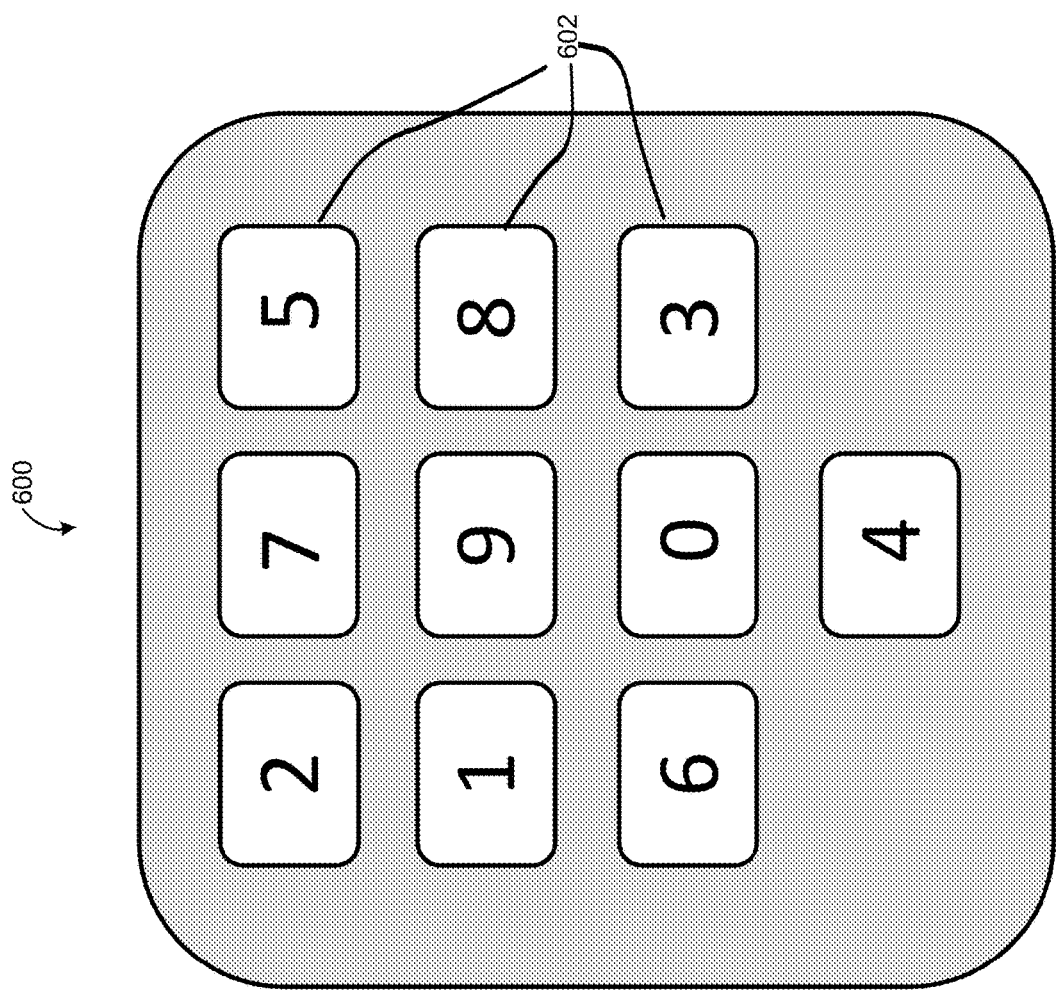
FIG. 6 is an example of a user interface that can be incorporated into an access control apparatus according to an embodiment of the present disclosure, such as the access control apparatus of FIG. 2.

FIGS. 6 and 7 depict additional examples of user interfaces 600, 700 that can be generated by the interface generator 248. Additional security can be added to embodiments of the disclosure by producing interfaces with non-sequential inputs 602, 702 (e.g., numbers, letters, symbols, pictures, etc.). For example, the traditional 10-digit keypad of inputs 306 shown in FIGS. 3A and 3B can be altered by the interface generator 248 to provide inputs 602 in the order illustrated in FIG. 6. Each of the inputs 602 0-9 is still present in the user interface 600, but the locations are changed, so that the inputs 602 are not presented in numerical order.

The interface generator 248 can create interfaces having non-sequential inputs in several ways. In some embodiments, the interface generator 248 stores a template input interface that defines several locations for image inputs. For example, the user interface 600 in FIG. 6 defines ten possible image input locations. The interface generator 248 can then randomly assign a single image input from a predetermined set of image inputs (in this case, ten digits, values 0-9) to each possible image input location in the template input interface. Once locations for image inputs 602 have been assigned, the interface generator 248 can communicate with the movement analyzer 244, for example, the location of each image input 602 on the user interface 600. By knowing the location of each input 602, the movement analyzer 244 can analyze images of the eye taken by the sensor 242 to assign detected input values to captured eye orientations and generate a detected access code from the detected input values. The interface generator 248 could store or have access to a database having predetermined full display images, which include all inputs 602 arranged in a non-sequential order. The full display images could each have an identity code (e.g., the interface 300 could be given an identity code of 1, while the interface 600 could be given an identity code of 2). The identity code could be used by the image analyzer 244 to retrieve or access data from a database or other memory including specific input values, input locations, and input types associated with the identity code. Once the location and value of each input is known, the movement analyzer 244 can once again analyze images of the eye taken by the sensor 242 to assign detected input values to captured eye orientations and generate a detected access code from the detected input values. Even if an unwanted onlooker could track eye movement during the code entry process, that onlooker would not know the order of digits on the user interface, making attempts compromise data much more difficult.

Similarly, the pattern of inputs 602, 702 generated can alternate or change from a traditional 10-digit keypad for each access attempt to provide additional security. For example, in some attempts, a traditional 10-digit keypad orientation of inputs 602 can be displayed, while in other attempts, an elongated rectangular array of inputs 702 can be displayed. The location of each input 602, 702 can be randomized as well. In each iteration of the user interface 300, 600, 700, the locations of each input 306, 602, 702 are communicated to the movement/image analyzer, as discussed above, which can use the known locations of inputs to determine the detected access code.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced. Other substitutions, modifications, changes, and omissions may be made in the design, operating conditions and arrangement of embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An access control apparatus, comprising:
a sensor that detects eye movement of a user;
a display that presents an input at each of a plurality of predetermined input locations, wherein a surface of the sensor is exposed in the display;
an image analyzer in communication with the sensor, the image analyzer determines a detected access code by evaluating a series of images of detected user eye movement taken by the sensor and determining a first match score for each image based on a comparison of the orientation of the eye in each image of the series of images to the plurality of predetermined input locations to generate a sequential pattern of inputs that corresponds to the detected access code, wherein
the comparison comprises comparing one or more features of the eye extracted from data detected by the sensor to one or more templates stored within the image analyzer, wherein the templates relate to eye positions corresponding to selection of each input at the plurality of predetermined input locations on the display, and
the sequential pattern of inputs is determined responsive to the first match score of each image of the series of images exceeding a first threshold match score indicating a high match confidence; and an authentication circuit in communication with the sensor and in communication with the image analyzer, the authentication circuit storing predetermined access code data corresponding to the user, the authentication circuit determines a second match score based on a comparison of the detected access code to the predetermined access code data and permits access beyond an access control point based on a comparison of the second match score to a second threshold match score for a numerical access code or a third threshold match score for an alphanumeric access code indicating that the detected eye movement matches the predetermined access code data, the second threshold match score higher than the third threshold match score.

2. The access control apparatus of claim 1, wherein:
the authentication circuit permits electronic access to an electronic data structure corresponding to the user based on the comparison indicating that the detected eye movement matches the predetermined access code data, and access beyond the access control point includes presenting account information of the electronic data structure on a user interface in communication with the authentication circuit.

3. The access control apparatus of claim 1, comprising:
the display is in communication with the authentication circuit, the image analyzer, and the sensor; and
an interface generator in communication with the image analyzer and the display, the interface generator provides a user interface to the display having the inputs having predetermined input locations and communicates the predetermined input locations to the image analyzer.

4. The access control apparatus of claim 1, comprising:
the display is in electrical communication with the authentication circuit and the sensor, the display presents a user interface displaying the inputs.

5. The access control apparatus of claim 1, comprising:
the display and a user interface generator are in electrical communication with the authentication circuit, the user interface generator creating a user interface including a plurality of digits to present on the display.

6. The access control apparatus of claim 1, wherein:
the access control apparatus is included in at least one of an automated teller machine, a gasoline pump, a credit card reader, a bank account interface, a safe, a garage door controller, and a security system.

7. The access control apparatus of claim 1, comprising:
the display and a user interface generator are in electrical communication with the authentication circuit, the user interface generator creates a user interface including a plurality of digits in a non-sequential order to present on the display.

8. The access control apparatus of claim 1, comprising:
a card reader in communication with the authentication circuit, the card reader detects a card and prompts the authentication circuit to access credential data corresponding to the card, the credential data including the predetermined access code.

9. The access control apparatus of claim 1, wherein:
the access control point is electronic, and access beyond the access control point includes displaying information associated with a bank account on a user interface in communication with the authentication circuit.

10. The access control apparatus of claim 1, wherein:
the sensor is an image capture device taking images of an iris of the user and the predetermined access code data includes a predetermined iris pattern, and the authentication circuit compares a captured image of the iris of the user to the predetermined iris pattern and permits access beyond an access control point based on the comparison indicating that the captured image of the iris matches the predetermined iris pattern.

11. The access control apparatus of claim 1, wherein:
the predetermined access code data corresponding to the user is provided to the authentication circuit by an access control host when a user supplies credential data to the access control apparatus.

12. A method, comprising:
presenting, on a display, a user interface comprising a plurality of inputs corresponding to predetermined input locations;
detecting, by a sensor located on the display, eye movement of a user;
generating, by an image analyzer in communication with the sensor, a detected access code by evaluating a series of images of detected user eye movement taken by the sensor and determining a first match score for each image based on a comparison of the orientation of the eye in each image of the series of images to the predetermined input locations to generate a sequential pattern of inputs that corresponds to the detected access code, wherein
the comparison comprises comparing one or more features of the eye extracted from data detected by the sensor to one or more templates stored within the image analyzer, wherein the templates relate to eye positions corresponding to selection of each input at the predetermined input locations,
the sequential pattern of inputs is determined responsive to the first match score of each image of the series of images exceeding a first threshold match score indicating a high match confidence, and
determining, by an authentication circuit coupled to the sensor, a second match score based on a comparison of the detected access code to a predetermined access code stored by the authentication circuit; and
outputting, by the authentication circuit for receipt by an access controller, an access permission decision based on a comparison of the second match score to a second threshold match score for a numerical access code or a third threshold match score for an alphanumeric access code indicating that the detected eye movement matches the predetermined access code data, the second threshold match score hi her than the third threshold match score.

13. The method of claim 12, comprising:
creating, on a user interface generator, a user interface displaying an array of at least three digits;
presenting, on the display, the user interface; and
determining, by the image analyzer, the detected access code by evaluating a series of images of detected eye movement of the user taken by the sensor and comparing the series of images to predetermined locations of the at least three digits on the user interface to generate the sequential pattern of inputs that corresponds to the detected access code.

14. The method of claim 12, comprising:
creating, on a user interface generator, the user interface displaying at least four letters;
presenting, on the display, the user interface; and
determining, by the image analyzer, the detected access code by evaluating a series of images of detected eye movement of the user taken by the sensor and comparing the series of images to predetermined locations of the at least four letters to generate the sequential pattern of inputs that corresponds to the detected access code.

15. The method of claim 12, comprising:

reading, by a card reader in communication with the authentication circuit, an identification card; and prompting the authentication circuit to access credential data corresponding to the identification card from an access control host, the credential data including the predetermined access code.

16. An access control apparatus, comprising:

display that presents a user interface having an array of inputs;

a sensor in communication with the display that detects eye movement of a user, wherein a surface of the sensor k exposed in the display;

an image analyzer, in communication with the sensor, that determines a detected access code by comparing detected eye movement to predetermined locations of each input in the array of inputs to determine that a first match score for each image in a series of images of detected eye movement exceeds a first threshold match score indicating a high match confidence in the detected access code, wherein determining the detected access code further comprises:

evaluating the series of images of detected user eye movement taken by the sensor and comparing the orientation of the eye in each image of the series of images to known input locations to generate a sequential pattern of inputs that corresponds to the detected access code, the comparison comprising comparing one or more features of the eye extracted from the data taken by the sensor to one or more templates stored within the image analyzer, wherein the templates relate to eye positions corresponding to selection of each input at the predetermined locations; and an authentication circuit, coupled to the sensor and in communication with the image analyzer, storing predetermined access code data corresponding to the user, wherein the authentication circuit determines a second match score based on a comparison of the detected access code to the predetermined access code data and permits virtual access to an electronic account beyond an access control point based on a comparison of the second match score to a second threshold match score for a numerical access code or a third threshold match score for an alphanumeric access code indicating that the detected eye movement matches the predetermined access code data, the second threshold match score higher than the third threshold match score.

17. The access control apparatus of claim 16, wherein:

the array of inputs includes at least three digits presented in non-sequential order.

* * * * *